(12) United States Patent
Terzic et al.

(10) Patent No.: US 12,492,379 B2
(45) Date of Patent: Dec. 9, 2025

(54) MAKING AND USING CARDIOPOIETIC CELLS

(71) Applicant: Mayo Foundation for Medical Education and Research, Rochester, MN (US)

(72) Inventors: Andre Terzic, Rochester, MN (US); Atta Behfar, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 453 days.

(21) Appl. No.: 17/278,380

(22) PCT Filed: Sep. 27, 2019

(86) PCT No.: PCT/US2019/053486
§ 371 (c)(1),
(2) Date: Mar. 22, 2021

(87) PCT Pub. No.: WO2020/069334
PCT Pub. Date: Apr. 2, 2020

(65) Prior Publication Data
US 2021/0348128 A1 Nov. 11, 2021

Related U.S. Application Data

(60) Provisional application No. 62/738,647, filed on Sep. 28, 2018.

(51) Int. Cl.
*C12N 5/077* (2010.01)
*A61K 35/34* (2015.01)
*C12N 15/88* (2006.01)

(52) U.S. Cl.
CPC ............ *C12N 5/0657* (2013.01); *A61K 35/34* (2013.01); *C12N 15/88* (2013.01); *C12N 2501/415* (2013.01); *C12N 2501/603* (2013.01); *C12N 2501/999* (2013.01)

(58) Field of Classification Search
CPC ............................ C12N 5/0657; C12N 15/88; C12N 2501/415; C12N 2501/603; C12N 2501/999; A61K 35/34
See application file for complete search history.

(56) References Cited

U.S. PATENT DOCUMENTS

| 6,908,764 | B2 * | 6/2005 | Czichos | ............... | C12N 5/0652 |
| | | | | | 435/363 |
| 2014/0038291 | A1 * | 2/2014 | Ahlfors | ................ | C12N 5/0678 |
| | | | | | 435/441 |
| 2017/0067023 | A1 * | 3/2017 | Yamashita | ............. | A61K 35/28 |

FOREIGN PATENT DOCUMENTS

| JP | 2017060422 A | * | 3/2017 |
| WO | WO 2013/134513 | | 9/2013 |
| WO | WO 2015/034897 | | 3/2015 |
| WO | WO 2018/098312 | | 5/2018 |
| WO | WO-2018078301 A1 | * | 5/2018 |

OTHER PUBLICATIONS

Behfar, A., et al., "Guided stem cell cardiopoiesis: discovery and translation," Journal of Molecular and Cellular Cardiology 45(4):523-529. doi: 10.1016/j.yjmcc.2008.09.122. Epub Sep. 26, 2008. (Year: 2008).*
Perino, M. G., et al., "Cardiomyogenic stem and progenitor cell plasticity and the dissection of cardiopoiesis," J Mol Cell Cardiol. 45(4):475-94. doi: 10.1016/j.yjmcc.2008.05.002. (Year: 2008).*
Cunningham, T. J., et al., "Id genes are essential for early heart formation," Genes Dev 31(13): 1325-1338. doi: 10.1101/gad.300400.117. (Year: 2017).*
David, R., et al., "Induction of MesP1 by Brachyury(T) generates the common multipotent cardiovascular stem cell," Cardiovascular Research 92(1): 115-22. doi: 10.1093/cvr/cvr158. (Year: 2011).*
McClay, D. R., et al., "Conditional specification of endomesoderm," Cells Dev 168: 203731. doi: 10.1016/j.cdev.2021.203731. Epub Oct. 2, 2021. (Year: 2021).*
Nowakowski, A., et al., "Genetic engineering of stem cells for enhanced therapy," Acta Neurobiol Exp 73(1): 1-18. (Year: 2013).*
Otto and Rao, Cell Proliferation 37(1): 97-110. doi: 10.1111/j.1365-2184.2004.00303.x. (Year: 2004).*
Sadahiro, T., et al., "Tbx6 Induces Nascent Mesoderm from Pluripotent Stem Cells and Temporally Controls Cardiac versus Somite Lineage Diversification," Cell Stem Cell 23(3): 382-395. doi: 10.1016/j.stem.2018.07.001. Epub Aug. 9, 2018. (Year: 2018).*
Kempf, H., et al., "Bulk cell density and Wnt/TGFbeta signalling regulate mesendodermal patterning of human pluripotent stem cells," Nat Commun 7: 13602. doi: 10.1038/ncomms13602.(Year: 2016).*
Tomaro-Duschesneau et al., "Microencapsulation for the therapeutic delivery of drugs, live mammalian and bacterial cells, and other biopharmaceutics: current status and future directions" J Pharm (Cairo) (Year: 2012).*

(Continued)

*Primary Examiner* — Robert M Kelly
*Assistant Examiner* — John David Moore
(74) *Attorney, Agent, or Firm* — Fish & Richardson P.C.

(57) ABSTRACT

This document relates to methods and materials for making and using cardiopoetic stem cells. For example, methods and materials for delivering one or more nucleic acids (e.g., one or more RNAs) encoding one or more early mesodermal transcription factors to a stem cell to generate a cardiopoetic stem cell are provided.

4 Claims, 7 Drawing Sheets

(56) References Cited

OTHER PUBLICATIONS

Warren et al., "Highly efficient reprogramming to pluripotency and directed differentiation of human cells with synthetic modified mRNA" Cell Stem Cell (Year: 2010).*

David et al., "induction of MesP1 by brachyury (T) generates the common multipotent cardiovascular stem cell" Cardiovascular Research (Year: 2011).*

Kempf et al., "Bulk cell density and Wnt/TGF Beta singaling regulate mesendodermal patterning of human pluripotent stem cells" Nat Commun 7 (Year: 2016).*

Behfar et al., "Guided stem cell cardiopoiesis: discovery and translation," J. Mol. Cell Cardiology, Oct. 2008, 45(4):523-529.

Ieda et al., "Direct Reprogramming of Fibroblasts into Functional Cardiomyocytes by Defined Factors," Cell, Aug. 6, 2010, 142(3):375-386.

Karanth et al., "pH-Sensitive liposomes-principle and application in cancer therapy," J. Pharm. Pharmacology, Apr. 2007, 59(4):469-483.

Li et al., Abstract 17349: Induction of Cardiopoiesis From Human Adipose-Derived Mesenchymal Stem Cells Using Microencapsulated-Modified-Messenger RNA, Circulation, Jun. 9, 2018, 136(S1):A17349.

Mozaffarian et al., "Heart Disease and Stroke Statistics—2015 Update: A Report From the American Heart Association," Circulation, Jan. 27, 2015, 131(4):e29-e322.

PCT International Preliminary Report on Patentability in International Appln. No. PCT/US2019/053486, dated Mar. 23, 2021, 6 pages.

PCT International Search Report and Written Opinion in International Appln. No. PCT/US2019/053486, dated Dec. 13, 2019, 8 pages.

Terzic et al., "Stem cell therapy for heart failure: Ensuring regenerative proficiency," Trends Cardiovascular Medicine, Jul. 2016, 26(5):395-404.

Warren et al, "Highly Efficient Reprogramming to Pluripotency and Directed Differentiation of Human Cells with Synthetic Modified mRNA," Cell Stem Cell, Nov. 5, 2010, 7(5):618-630.

Abou-Saleh et al., "The march of pluripotent stem cells in cardiovascular regenerative medicine," Stem Cell Research & Therapy, 2018, 9(201):1-31.

* cited by examiner

MAKING AND USING CARDIOPOIETIC CELLS

CROSS-REFERENCE TO RELATED APPLICATIONS

This application is a National Stage application under 35 U.S.C. § 371 of International Application No. PCT/US2019/053486, having an International Filing Date of Sep. 27, 2019, which claims priority to U.S. Application Ser. No. 62/738,647, filed on Sep. 28, 2018. The disclosure of the prior application is considered part of the disclosure of this application, and is incorporated in its entirety into this application.

BACKGROUND

1. Technical Field

This document relates to methods and materials for making and using cardiopoetic stem cells. For example, one or more nucleic acids (e.g., one or more RNAs) encoding one or more early mesodermal transcription factors can be delivered to a stem cell to generate a cardiopoetic stem cell. In some cases, a cardiopoetic stem cell generated as described herein can be used to improve cardiac function.

2. Background Information

A heart attack, also called a myocardial infarction, occurs when a part of the heart muscle does not receive enough blood flow. The more time that passes without treatment to restore blood flow, the greater the damage to the heart muscle. Every year, about 735,000 Americans have a heart attack, including about 210,000 heart attacks that happen to people who have already had a first heart attack (Mozaffarian et al., *Circulation*, 131(4):e29-322 (2015)).

SUMMARY

Current efforts in cardiac regenerative medicine have utilized different stem cell products to institute resuscitation of cardiac function. One example is cardiopoetic stem (CP) cells, which have shown signs of efficacy in improving cardiac function for ischemic heart failure. However, the manufacturing cost and inherent variability of cardiac transcription factor activity in this regenerative platform impairs its broad-based use in practice.

This document provides methods and materials for making and using CP cells. In some cases, delivery of one or more nucleic acids (e.g., one or more RNAs) encoding one or more early mesodermal transcription factors can be delivered to a stem cell to generate a CP cell. For example, one or more nucleic acids encoding one or more early mesodermal transcription factors can be delivered to a stem cell using a microencapsulated-modified-messenger RNA ($M^3RNA$) platform to generate a CP cell. In some cases, CP cells provided herein can be used to improve cardiac function. For example, CP cells generated herein can be delivered to and/or generated within heart tissue of a mammal to improve the mammal's cardiac function.

As demonstrated herein, CP cells can be engineered using nucleic acid (e.g., mRNA) encoding brachyury (T) and nucleic acid (e.g., mRNA) encoding Oct4. For example, $M^3RNA$ can be used to deliver mRNA encoding T and/or mRNA encoding Oct4, and optionally to deliver a GSK inhibitor (e.g., CHIR99021) and/or a Wnt inhibitor (e.g., IWP-2), to stem cells (e.g., human adipose-derived mesenchymal stem cells (AD-MSCs)) to engineer CP cells in vitro in as few as 5 days. This approach can provide a simple, cost-effective, and time-saving approach to induce cardiopoesis in stem cells (e.g., AD-MSCs) to generate CP cells. As such, this approach can serve as a highly translatable platform to circumvent many burdens associated with current strategies for inducing cardiopoesis for human clinical applications (e.g., cocktail-based cardiopoesis protocols), and can be used in the development of cell-based therapies for future clinical trials and practice.

In general, one aspect of this document features methods for generating a cardiopoetic stem cell. The methods can include, or consist essentially of, delivering a mRNA encoding an early mesodermal transcription factor to a stem cell under conditions where the mRNA expresses the early mesodermal transcription factor. The stem cell can be an adult stem. The stem cell can be a mesenchymal stem cell (MSC). The MSC can be an adipose-derived stem cell (AD-MSC). The AD-MSC can be a human AD-MSC. The cardiopoetic stem cell can be generated in vitro. The early mesodermal transcription factor can be T. The method also can include delivering a mRNA encoding a cardiac transcription factor to the stem cell under conditions where the mRNA expresses the cardiac transcription factor. The cardiac transcription factor can be Oct4. The method also can include delivering a glycogen synthase kinase (GSK) inhibitor to the stem cell. The GSK inhibitor can be CHIR99021. The method also can include delivering a wingless/integrated (Wnt) inhibitor to the stem cell. The Wnt inhibitor can be IWP-2. The cardiopoetic stem cell can be generated within 5 days of delivering the mRNA encoding the early mesodermal transcription factor to the stem cell.

In another aspect, this document features an engineered cardiopoetic stem cell generated using the method described herein. Methods for generating a cardiopoetic stem cell can include, or consist essentially of, delivering a mRNA encoding an early mesodermal transcription factor to a stem cell under conditions where the mRNA expresses the early mesodermal transcription factor. The stem cell can be an adult stem. The stem cell can be a mesenchymal stem cell (MSC). The MSC can be an adipose-derived stem cell (AD-MSC). The AD-MSC can be a human AD-MSC. The cardiopoetic stem cell can be generated in vitro. The early mesodermal transcription factor can be T. The method also can include delivering a mRNA encoding a cardiac transcription factor to the stem cell under conditions where the mRNA expresses the cardiac transcription factor. The cardiac transcription factor can be Oct4. The method also can include delivering a glycogen synthase kinase (GSK) inhibitor to the stem cell. The GSK inhibitor can be CHIR99021. The method also can include delivering a wingless/integrated (Wnt) inhibitor to the stem cell. The Wnt inhibitor can be IWP-2. The cardiopoetic stem cell can be generated within 5 days of delivering the mRNA encoding the early mesodermal transcription factor to the stem cell.

In another aspect, this document features a method for treating a mammal with a cardiac event. The methods can include, or consist essentially of, (a) administering an engineered cardiopoetic stem cell generated using the method described herein to a mammal with a cardiac event, or (b) generating an engineered cardiopoetic stem cell in a mammal having a cardiac event by delivering a mRNA encoding an early mesodermal transcription factor to a stem cell within the mammal under conditions where the mRNA expresses the transcription factor, where the severity of the cardiac event is reduced following step (a) or step (b). The mammal can be a human. The cardiac event can be myocardial infarction, heart failure, recurrent myocardial infarction, repeat hospitalization for cardiac-related events, or ischemic heart disease. In some cases, the method can include step (a). The stem cell can be an adult stem. The stem cell can be a MSC. The MSC can be an AD-MSC. The AD-MSC can be a human AD-MSC. The cardiopoetic stem cell can be generated in vitro. In some cases, method can include step (b). The stem cell can be an adult stem. The stem cell can be a MSC. The MSC can be an AD-MSC. The AD-MSC can be a human AD-MSC. In some cases, the method can include both steps (a) and (b).

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1A contains representative fluorescent images of AD-MSCs stained with CD90 (BV421), CD73 (PE), and CD45 (APC). MSCs do not express CD45. Scale bar=50 μm. FIG. 1B contains representative flow cytometry scatter plots of AD-MSCs stained with CD90 (BV421), CD73 (PE), and CD45 (APC).

FIG. 2A contains representative ICC images showing expression of T at indicated time points post-transfection. FIG. 2B contains a quantitation of nuclear fluorescence intensity using ImageJ (arbitrary fluorescence intensity with Mean±SEM in at least three experiments and at least six images/experiment).

FIG. 3A contains representative ICC images showing expression of Nkx2.5 at indicated time points post-transfection. FIG. 3B contains a quantitation of nuclear fluorescence intensity using ImageJ (arbitrary fluorescence intensity with Mean±SEM in at least three experiments and at least six images/experiment).

FIG. 4A contains a representative blot using Li-Cor. FIG. 4B contains a quantitation of protein levels based on fluorescence intensity after normalization to total protein.

DETAILED DESCRIPTION

Figure 1A:
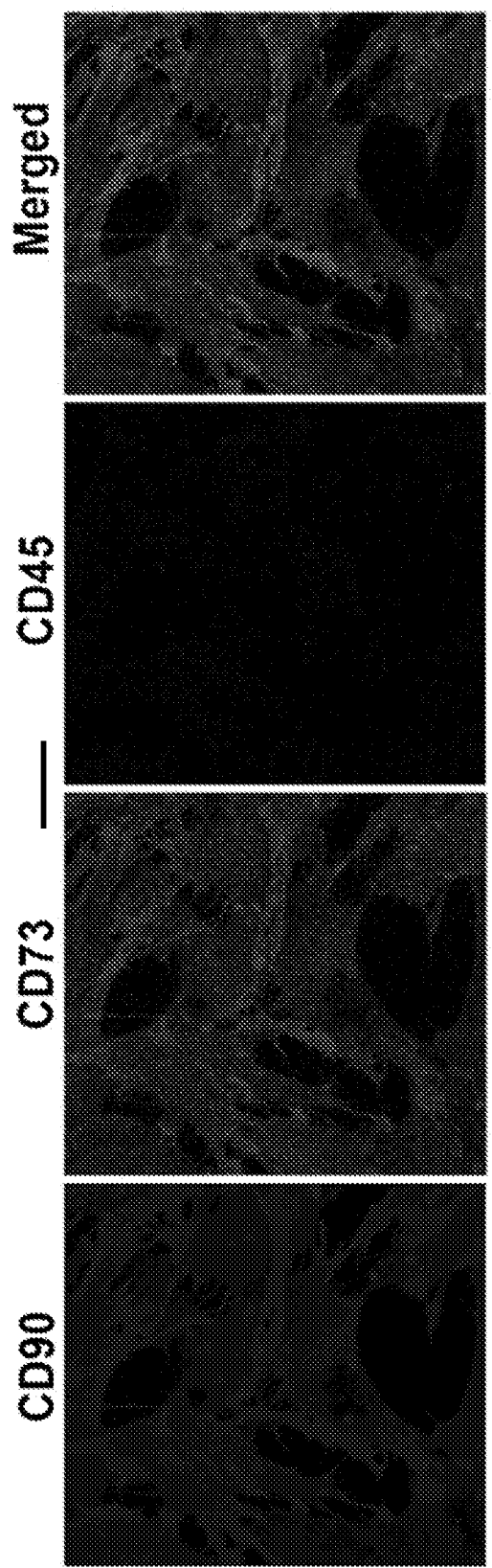
FIGS. 1A-1B show that adipose-derived MSCs exhibit characteristic CD markers.

This document provides engineered CP cells and methods for making and using engineered CP cells. For example, one or more nucleic acids (e.g., one or more RNAs) encoding one or more early mesodermal transcription factors can be delivered to a stem cell to generate a CP cell (e.g., an engineered CP cell). In some cases, one or more RNAs encoding one or more early mesodermal transcription factors can be delivered to tissue (e.g., heart tissue) within a mammal where the RNA is expressed to generate a functional polypeptide. In some cases, a microencapsulated-modified-messenger RNA ($M^3RNA$) platform can be used to deliver one or more mRNAs encoding one or more early mesodermal transcription factors to a stem cell to generate an engineered CP cell.

In some cases, generating CP cells as described herein (e.g., by delivering one or more RNAs encoding one or more early mesodermal transcription factors, and, optionally, one or more nucleic acids encoding one or more cardiac transcription factors, one or more GSK inhibitors, and/or one or more Wnt inhibitors, to a stem cell such as a human AD-MSC) can be performed in vitro. In cases where cardiopoetic cells are generated in vitro, one or more nucleic acids (e.g., one or more RNAs) encoding one or more early mesodermal transcription factors can be delivered to a stem cell in culture.

In some cases, generating CP cells as described herein (e.g., by delivering one or more RNAs encoding one or more early mesodermal transcription factors, and, optionally, one or more nucleic acids encoding one or more cardiac transcription factors, one or more GSK inhibitors, and/or one or more Wnt inhibitors, to a stem cell such as a human AD-MSC) can be performed in vivo. In cases where cardiopoetic cells are generated in vivo, one or more nucleic acids (e.g., one or more RNAs) encoding one or more early mesodermal transcription factors can be delivered to a stem cell in vivo (e.g., administered locally or systemically to a mammal).

In some cases, CP cells can be generated as described herein (e.g., by delivering one or more RNAs encoding one or more early mesodermal transcription factors, and, optionally, one or more nucleic acids encoding one or more cardiac transcription factors, one or more GSK inhibitors, and/or one or more Wnt inhibitors, to a stem cell such as a human AD-MSC) in as few as 5 days.

A nucleic acid encoding one or more early mesodermal transcription factors can be any appropriate type of nucleic acid. Examples of nucleic acids that can encode one or more early mesodermal transcription factors include, without limitation, DNA, RNA (e.g., mRNA), and combinations thereof. In some cases, a nucleic acid encoding one or more early mesodermal transcription factors can be a mRNA.

A nucleic acid encoding one or more early mesodermal transcription factors can encode any appropriate early mesodermal transcription factor. A non-limiting example of an early mesodermal transcription factor is T. In some cases, a $M^3RNA$ can include mRNA encoding T. For example, one or more nucleic acids (e.g., one or more RNAs) encoding T can be delivered to a stem cell to generate a CP cell.

In some cases, one or more nucleic acids (e.g., one or more RNAs) encoding one or more cardiac transcription factors (e.g., polypeptides useful for regenerating cardiac function and/or tissue) also can be delivered to a stem cell to generate a CP cell. Examples of cardiac transcription factors include, without limitation, POU homeodomain proteins (e.g., Oct-4), NK2 homeobox proteins (e.g., NKX2 proteins such as Nkx2.5), myocyte enhancing factors (e.g., MEF2 proteins such as Mef2c), GATA binding proteins (e.g., GATA1, GATA2, GATA3, GATA4, GATA5, and GATA6), T-box transcription factors (e.g., TBX1, TBX2, TBX3, TBX4, TBX5, TBX6, TBX10, TBX15, TBX18, TBX19, TBX20, TBX21, and TBX22), mesoderm posterior proteins (e.g., MESP1 and MESP2), neutrophil-activating proteins (e.g., NAP-2 and NAP-3), transforming growth factors (e.g., TGF-α and TGF-β), erythroblastic leukemia viral oncogene-3 (ErBb3), vascular endothelial growth factor (VEGF), insulin-like growth factor 1 (IGF-1), fibroblast growth factor (FGF-2), platelet-derived growth factors (e.g., PDGFA, PDGFB, PDGFC, and PDGFD), Interleukin-2 (IL-2), CD19, CD20, and CD80/86. For example, one or more nucleic acids (e.g., one or more RNAs) encoding one or more Oct4, Nkx2.5, and Mef2c can be delivered to a stem cell to generate a CP cell. For example, one or more nucleic acids (e.g., one or more RNAs) encoding T and Oct4 can be delivered to a stem cell to generate a CP cell.

In some cases, one or more glycogen synthase kinase (GSK) inhibitors also can be delivered to a stem cell to generate a CP cell. In some cases, a GSK inhibitor can be a small molecule inhibitor. A non-limiting example of a GSK inhibitor is CHIR99021. For example, CHIR99021 can be delivered to a stem cell to generate a CP cell. For example, one or more nucleic acids (e.g., one or more RNAs) encoding T and CHIR99021 can be delivered to a stem cell to generate a CP cell.

In some cases, one or more wingless/integrated (Wnt) inhibitors also can be delivered to a stem cell to generate a CP cell. In some cases, a Wnt inhibitor can be a small molecule inhibitor. A non-limiting example of a Wnt inhibitor is IWP-2. For example, IWP-2 can be delivered to a stem cell to generate a CP cell. For example, one or more nucleic acids (e.g., one or more RNAs) encoding T and IWP-2 can be delivered to a stem cell to generate a CP cell.

In some cases, one or more nucleic acids (e.g., one or more RNAs) encoding one or more early mesodermal transcription factors (and, optionally, one or more nucleic acids encoding one or more cardiac transcription factors) can be modified. For example, a nucleic acid can be modified for sustained gene expression. For example, nucleotides can be modified for increased stability. In some cases, one or more uracil residues of an RNA can be replace with a modified uracil residue. Examples of modified uracil residues include, without limitation, pseudouridine (Ψ), dihydrouridine (D), and dideoxyuracil.

One or more nucleic acids (e.g., one or more RNAs) encoding one or more early mesodermal transcription factors, and, optionally, one or more nucleic acids encoding one or more cardiac transcription factors, one or more GSK inhibitors, and/or one or more Wnt inhibitors, can be delivered to a stem cell using any appropriate method. In some cases, one or more nucleic acids can be encapsulated within a delivery vehicle (e.g., a particle). For example, when one or more nucleic acids are encapsulated within a particle, particle-mediated delivery methods can be used to deliver the encapsulated nucleic acid to a stem cell. In some cases, one or more nucleic acids can be delivered to a stem cell using a M³RNA platform. In some cases, one or more nucleic acids can be delivered to a stem cell using delivery methods as described elsewhere (see, e.g., WO 2018/098312).

One or more RNAs encoding one or more early mesodermal transcription factors, and, optionally, one or more nucleic acids encoding one or more cardiac transcription factors, one or more GSK inhibitors, and/or one or more Wnt inhibitors, can be delivered to any appropriate type of stem cell. A stem cell can be an adult stem cell. A stem cell can be from any appropriate tissue type and/or cell type (e.g., a mesenchymal stem cell (MSC) such as an adipose-derived stem cell (AD-MSC), a bone marrow-derived stem cell (BMSC), an endothelial stem cell, and a dental pulp stem cell). A stem cell can be from any appropriate type of mammal (e.g., humans, non-human primates such as monkeys, dogs, cats, horses, cows, pigs, sheep, rabbits, mice, and rats). For example, a stem cell can be an AD-MSC such as a human AD-MSC.

This document also provides methods for improving cardiac function within a mammal. For example, CP cells provided herein (e.g., CP cells engineered by delivering one or more RNAs encoding one or more early mesodermal transcription factors, and, optionally, one or more nucleic acids encoding one or more cardiac transcription factors, one or more GSK inhibitors, and/or one or more Wnt inhibitors, to a stem cell such as a human AD-MSC) can be used to improve cardiac function within a mammal. In some cases, CP cells provided herein can be delivered to and/or generated within heart tissue to improve cardiac function. For example, one or more CP cells can be delivered to and/or generated within heart tissue within a mammal to improve the mammal's cardiac function.

In cases where CP cells are generated in vitro, one or more CP cells can be delivered to a mammal in need thereof (e.g., a mammal in need of cardiac tissue regeneration and/or improved cardiac function). Any appropriate method can be used to deliver CP cells to heart tissue within a mammal.

In cases where CP cells are generated in vivo, one or more nucleic acids (e.g., one or more RNAs) encoding one or more early mesodermal transcription factors, and, optionally, one or more nucleic acids encoding one or more cardiac transcription factors, one or more GSK inhibitors, and/or one or more Wnt inhibitors, can be delivered to a mammal in need thereof (e.g., a mammal in need of cardiac tissue regeneration and/or improved cardiac function). Any appropriate method can be used to deliver one or more early mesodermal transcription factors, and, optionally, one or more nucleic acids encoding one or more cardiac transcription factors, one or more GSK inhibitors, and/or one or more Wnt inhibitors, to a mammal. For example, one or more nucleic acids encoding one or more early mesodermal transcription factors, and, optionally, one or more nucleic acids encoding one or more cardiac transcription factors, one or more GSK inhibitors, and/or one or more Wnt inhibitors, can be delivered to a mammal using a particle-mediated delivery method. Particle-mediated delivery methods can be as described elsewhere (see, e.g., WO 2018/098312).

CP cells provided herein can be delivered to and/or generated within any type of mammal. Examples of mammals that CP cells provided herein can be delivered to and/or generated within include, without limitation, humans, non-human primates such as monkeys, dogs, cats, horses, cows, pigs, sheep, rabbits, mice, and rats. In some cases, CP cells provided herein can be delivered to and/or generated within a human.

When CP cells provided herein are delivered to and/or generated within mammal, the mammal can be experiencing, or can be at risk of experiencing, any adverse cardiac event (e.g., a major adverse cardiac event). Examples of major adverse cardiac events include, without limitation, myocardial infarction (e.g., acute myocardial infarction), heart failure, recurrent myocardial infarction, repeat hospitalization for cardiac-related events, and ischemic heart disease. In some cases, CP cells provided herein can be delivered to and/or generated within a mammal experiencing myocardial infarction, such as acute myocardial infarction.

In some cases, the methods and materials described herein can be used to improve cardiac function. Examples of improved cardiac function include, without limitation, increased survivorship, reduced hospitalization, symptom-free tolerance of physical activity, improved global physical fitness, improved cardiac ejection fraction, improved cardiac output, improved stroke volume, improved cardiac mass index, and reduced scar size.

The invention will be further described in the following examples, which do not limit the scope of the invention described in the claims.

EXAMPLES

Example 1: Induction of Cardiopoesis from Human Adipose-Derived Mesenchymal Stem Cells Using Microencapsulated-Modified-Messenger RNA The following demonstrates the successful use of microencapsulated-modified-messenger RNA ($M^3$-RNA) in conjunction with small molecule inhibitors to create an engineered cardiopoetic stem cell lineage from human adipose-derived mesenchymal stem cells (AD-MSCs).

Human AD-MSCs were transfected with mRNA encoding brachyury (T) and/or Oct4 for up to 48 hours prior to the addition of GSK inhibitor (CHIR99021) and/or Wnt inhibitor (IWP-2) for another 24-48 hours. The cells were probed for cardiac mesoderm marker Mesp1 and cardiopoetic markers Nkx2.5 and Mef2c expression using immunocytochemistry.

Transfection of human AD-MSCs with Oct4 mRNA induced nuclear Oct4 expression 4 hours post-transfection that peaked at 24 hours. Co-transfection with Oct4 and T mRNA induced Mesp1 expression. A combined or sequential transfection of AD-MSCs with either Oct4 and/or T, along with the addition of CHIR99021 and/or IWP-2 was then employed to assess cardiopoetic markers Nkx2.5 and Mef2c expression. While many permutations yielded comparable results, transfection with T alone for 48 hours followed by CHIR99021 for 48 hours was the most effective approach in inducing maximal Nkx2.5 and Mef2c expression.

These results demonstrate that transfection of human AD-MSCs with $M^3$-RNA encoding cardiogenic transcription factors with small molecular inhibitors induces an engineered cardiopoetic stem cell lineage.

This example demonstrates a novel approach to engineer cardiopoetic stem cells using Oct4 and T mRNA with small molecule inhibitors in vitro using human AD-MSCs in as few as 5 days. This approach circumvents many limitations of current cocktail-based cardiopoesis protocols and serves as a highly translatable platform to ease the cost burden in inducing cardiopoesis for human clinical applications.

Example 2: Engineering Cardiopoesis Using Microencapsulated-Modified-Messenger RNA $M^3$RNA Current strategies of management of heart failure patients focus on preserving or delaying deterioration, but are unable to restore cardiac function to pre-injury state. Cell therapy, such as CP cells, has shown to be a promising approach to address this issue. Early and advanced clinical trials using CP cells have shown signals of efficacy in improving cardiac function. The CP platform has been developed over the past decade, incorporating a lineage-specifying approach termed cardiopoesis to increase the regenerative potency of mesenchymal stem cells (MSCs). However, the manufacturing cost, duration of induction, and complexity of cell manufacturing impair its potential for broad-based use in practice. To address this, the novel microencapsulated-modified-messenger RNA (M3RNA) platform was developed as a cost-effective and time-saving approach to induce cardiopoesis.

Figure 1B:
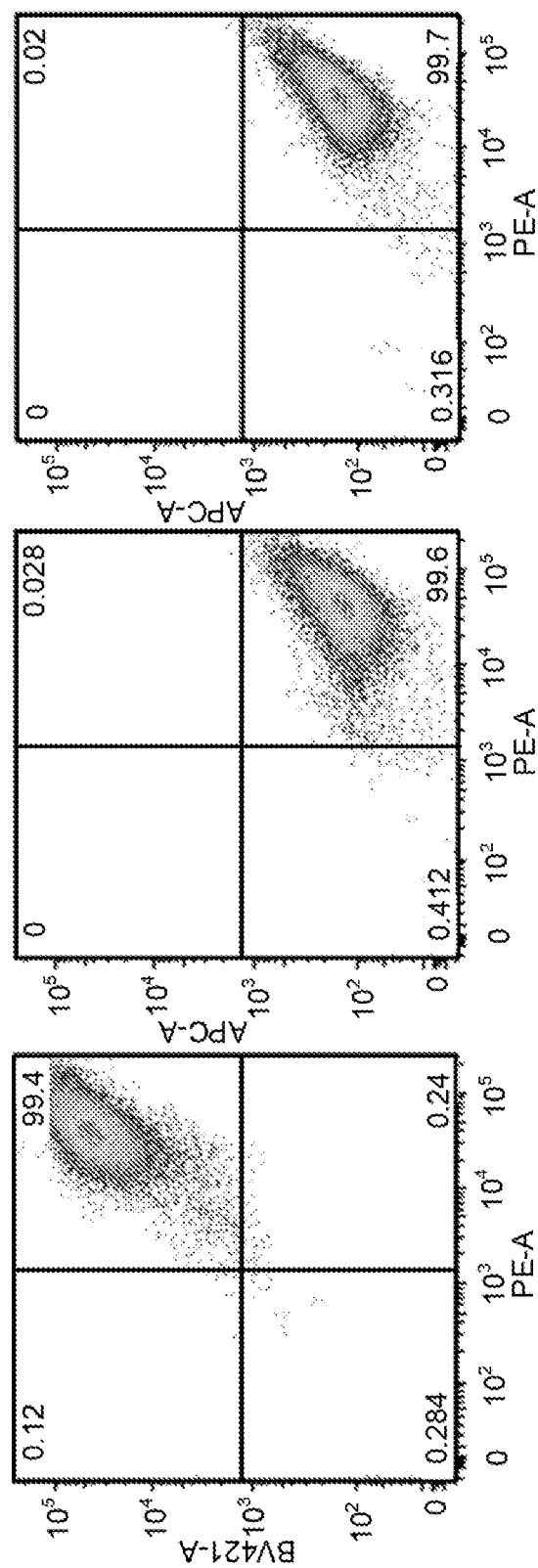

Flow cytometry analyses showed that AD-MSCs exhibit characteristic CP markers $CD90^+/CD73^+/CD45^-$. Fluorescent images of AD-MSCs stained with CD90 (BV421), CD73 (PE) and CD45 (APC), but did not stain with CD45 (FIG. 1A). Flow cytometry scatter plots of AD-MSCs also revealed staining with CD90 (BV421), CD73 (PE) and CD45 (APC) (FIG. 1B).

Human AD-MSCs were transfected with $M^3$RNA encoding T and/or cardiac transcription factors Nkx2.5 and/or Mef2c for 48 hours followed by incubation in media for 24 hours. Changes in cardiopoetic markers were probed using immunocytochemistry (ICC) and western blots of nuclear fractions.

Figure 2A:
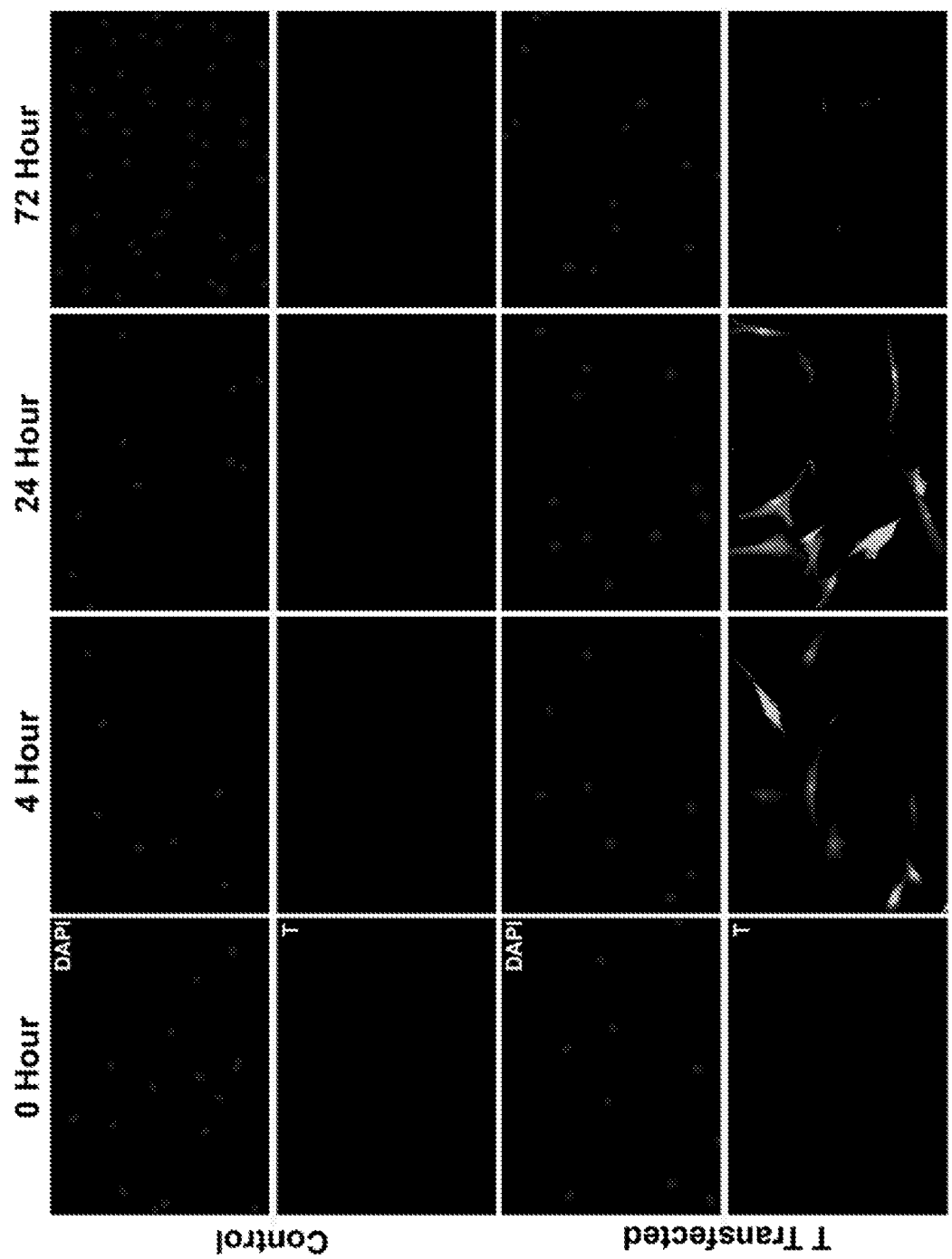
FIGS. 2A-2B show that transfection of AD-MSCs with $M^3RNA$ encoding brachyury (T) increases the expression of T in a rapid and transient fashion compared to non-transfection control.
Figure 2B:
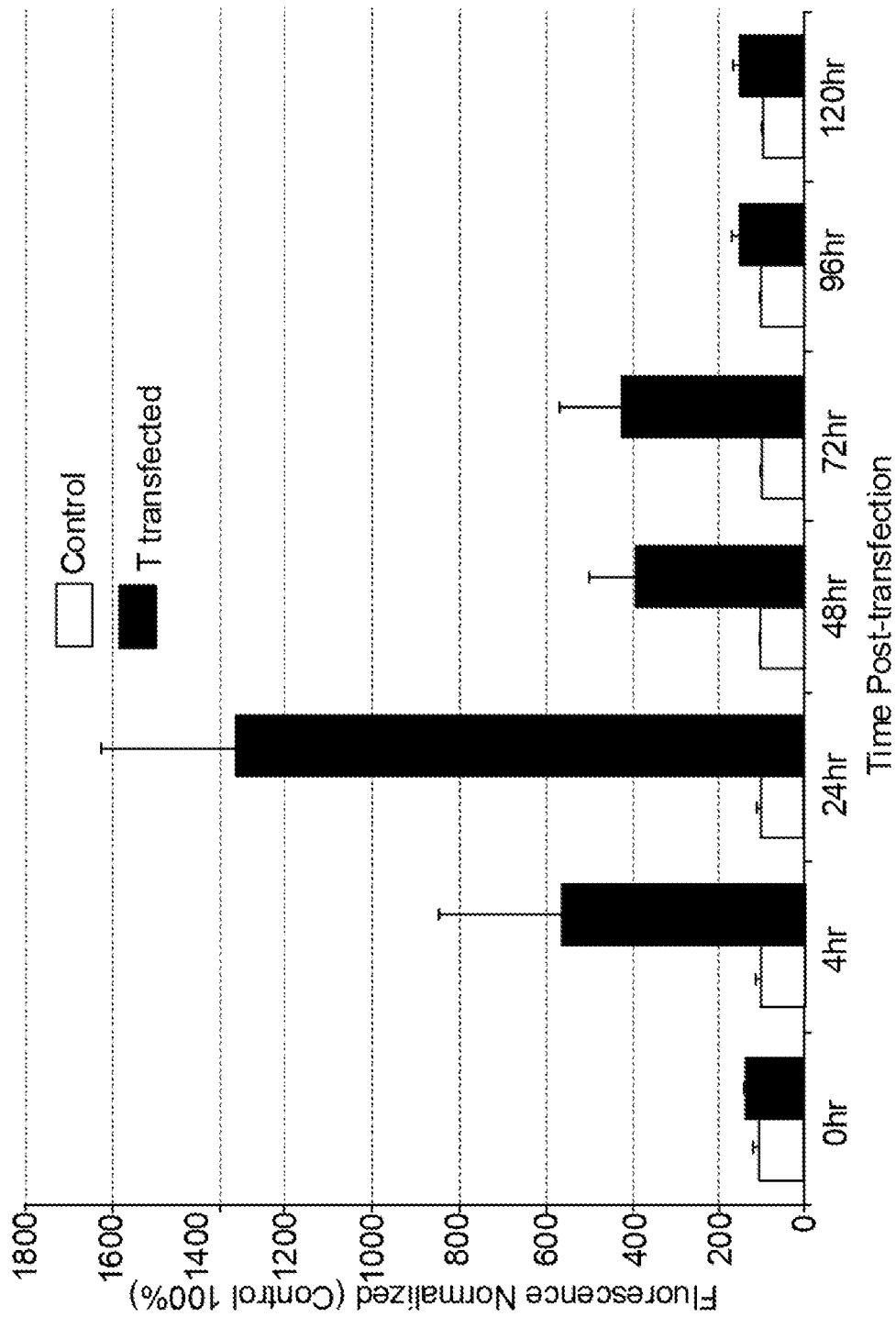

Rapid and transient expression of T polypeptides was observed in AD-MSCs transfected with $M^3$RNA encoding T (FIGS. 2A-2B). T polypeptide expression peaked at 24 hours post-transfection.

Figure 3A:
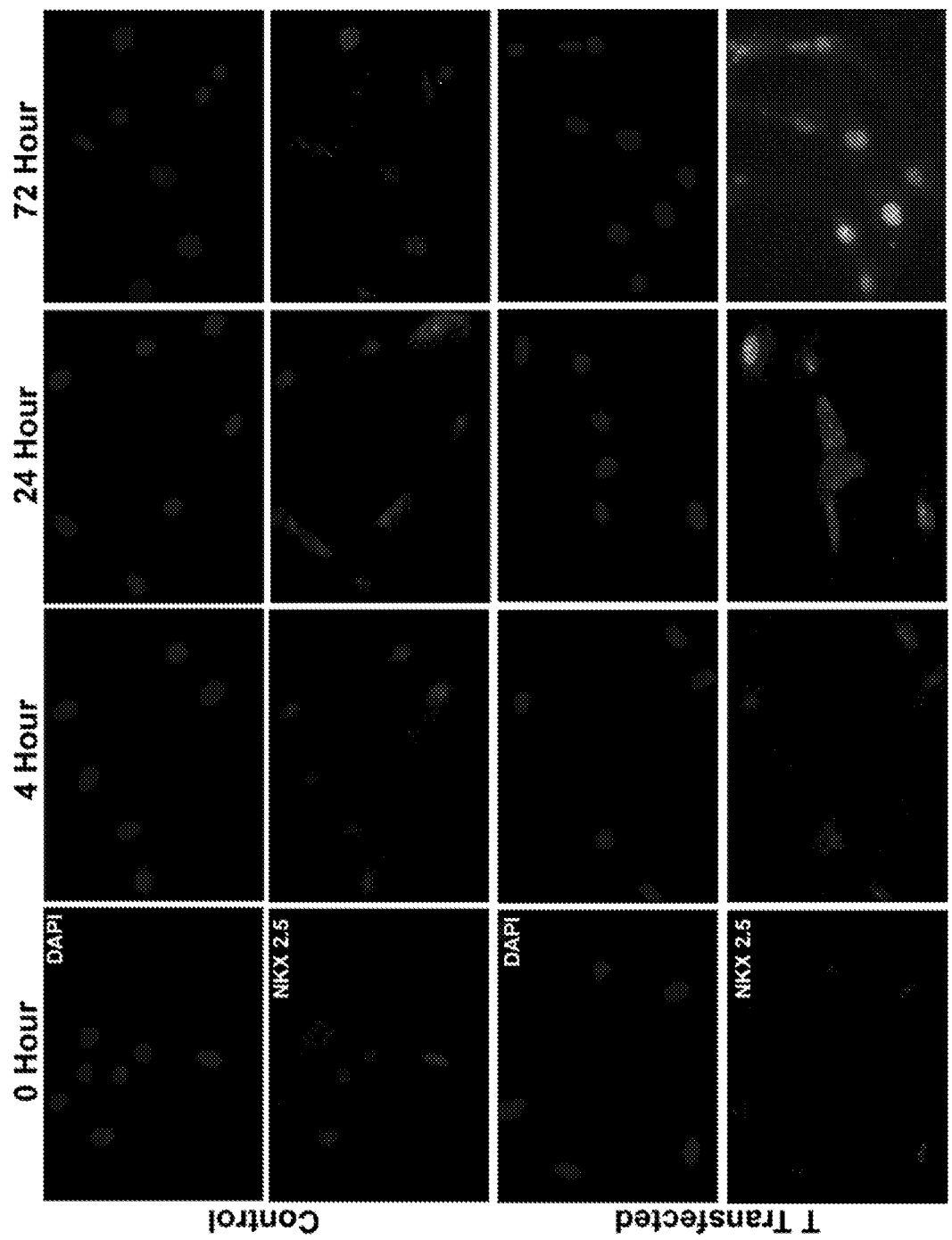
FIGS. 3A-3B show that transfection of AD-MSCs with $M^3RNA$ encoding T increases the expression of Nkx2.5, a cardiac transcription factor downstream of T.
Figure 3B:
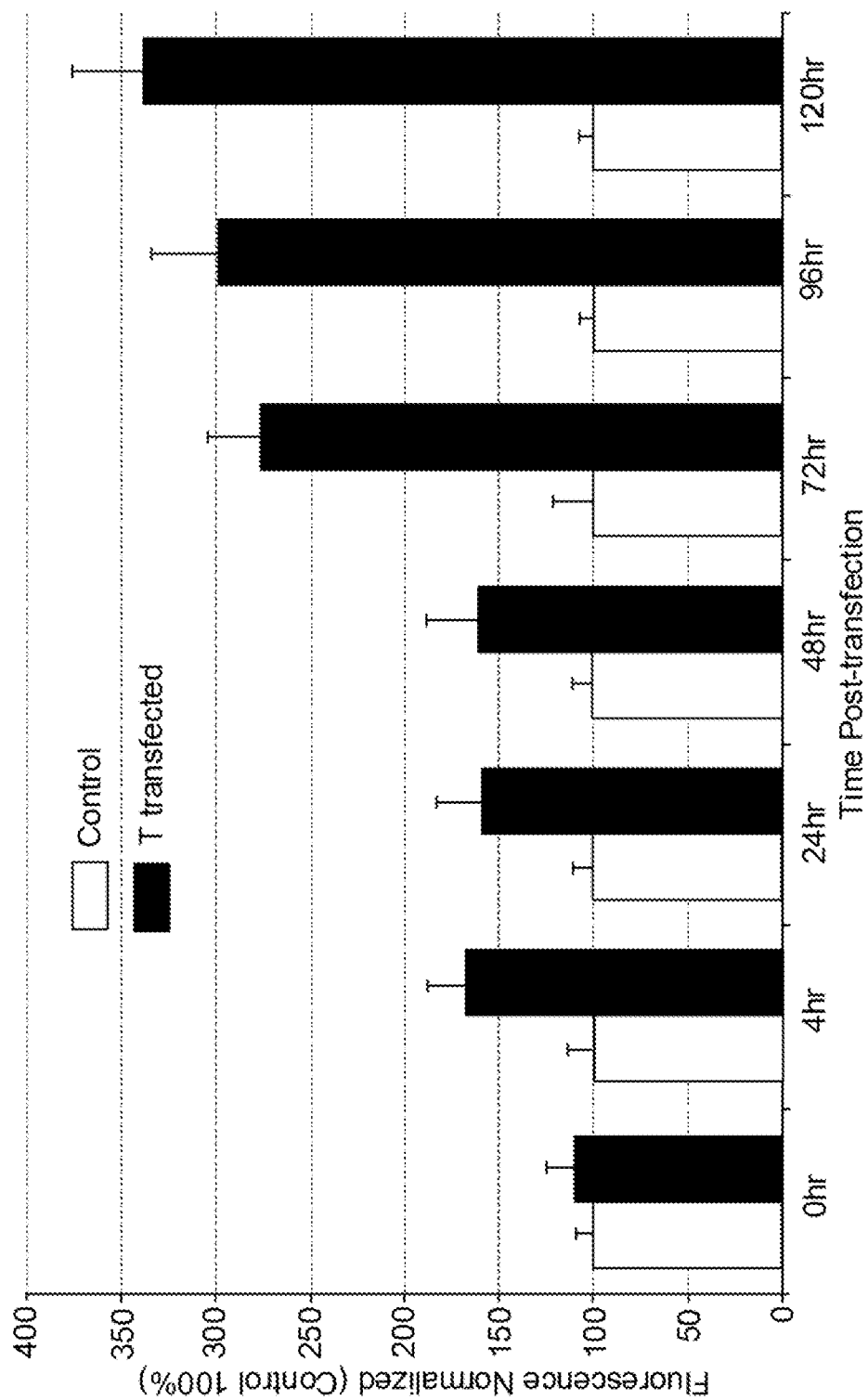

Increased polypeptide levels of Nkx2.5, a cardiac transcription factor downstream of T, were observed in AD-MSCs transfected with $M^3$RNA encoding T (FIGS. 3A-3B).

Figure 4A:
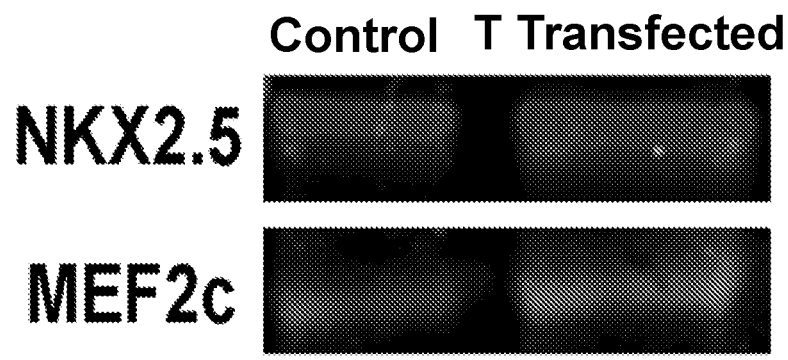
FIGS. 4A-4B show that a western blot of nuclear fraction of AD-MSCs transfected with T shows increased levels of cardiopoetic markers Nkx2.5 and Mef2c compared to non-transfection control.
Figure 4B:
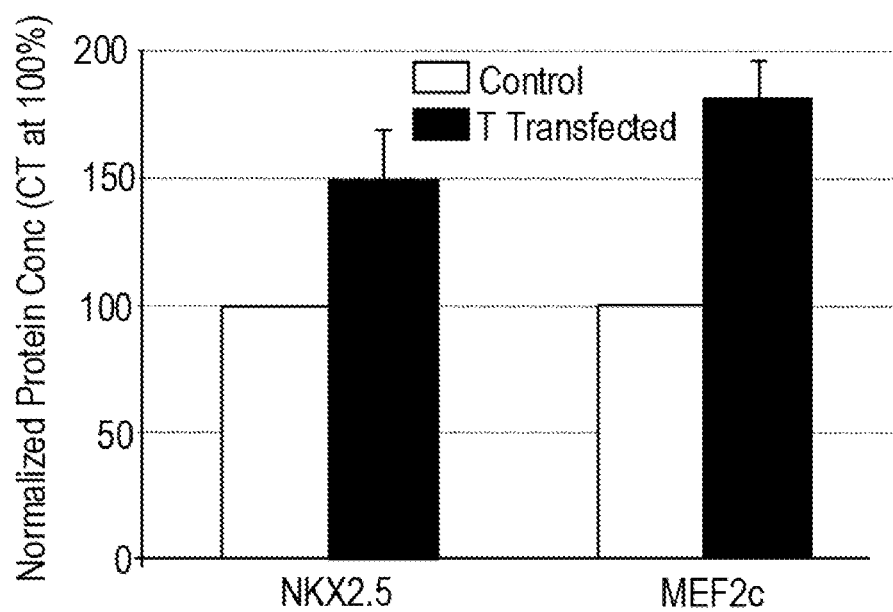

Increased levels of cardiopoetic markers Nkx2.5 and Mef2c were observed in AD-MSCs transfected with $M^3$RNA encoding T (FIGS. 4A-4B). Expression of cardiopoetic markers Nkx2.5 and Mef2c peaked at 72 hours post-transfection.

These results demonstrate that transfection of (AD-MSCs) with $M^3$RNA encoding early mesodermal and/or cardiac transcription factor(s) induces an engineered cell phenotype comparable to CP cells.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for generating a cardiopoietic stem cell within 5 days, wherein said method comprises:
   (a) delivering a microencapsulated-modified-messenger RNA ($M^3$RNA) encoding brachyury to adipose-derived mesenchymal stem cells obtained from an adult human in culture under conditions wherein said $M^3$RNA transiently expresses said brachyury within said adipose-derived mesenchymal stem cells; and
   (b) delivering, after 48 hours of said step (a), a glycogen synthase kinase inhibitor to said adipose-derived mesenchymal stem cells in culture, wherein said cardiopoietic stem cell is generated within 5 days of said step (a).

2. The method of claim 1, wherein said method further comprises delivering a $M^3$RNA encoding a cardiac transcription factor to said adipose-derived mesenchymal stem cells in culture during said step (a) under conditions wherein said $M^3$RNA encoding said cardiac transcription factor expresses said cardiac transcription factor within said adipose-derived mesenchymal stem cells.

3. The method of claim 1, wherein said glycogen synthase kinase inhibitor is CHIR99021.

4. The method of claim 2, wherein said cardiac transcription factor is Oct4.

* * * * *